INVENTORS
KARL LAUER
HEINZ-GÜNTER BUDKA
GEORG STOECK
BY
BURGESS, DINKLAGE & SPRUNG
ATTORNEYS.

United States Patent Office 3,686,117
Patented Aug. 22, 1972

---

3,686,117
PROCESS FOR THE CHROMATOGRAPHIC
SEPARATION OF MULTI-COMPONENT
MIXTURES
Karl Lauer, Strahlenburg, and Heinz-Günter Budka and Georg Stoeck, Mannheim-Waldhof, Germany, assignors to Boehringer Mannheim GmbH, Mannheim, Germany
Filed Sept. 25, 1970, Ser. No. 75,465
Claims priority, application Germany, July 23, 1970,
P 20 36 525.7
Int. Cl. B01d 15/08
U.S. Cl. 210—31 C
19 Claims

ABSTRACT OF THE DISCLOSURE

Multi-component mixtures are chromatographically separated into their components on a large scale by using a separation column divided into two sections, passing the feed stream into the first section, removing the fractions containing impurities from the end of the first section, simultaneously passing an equivalent amount of elution agent into the second section, thereupon connecting the two column sections with each other until there appears at the end of the first section the fraction containing impurities from the next cycle of feed passed into the first section, and recovering the separated main components at the end of the second section.

---

Figure 1:
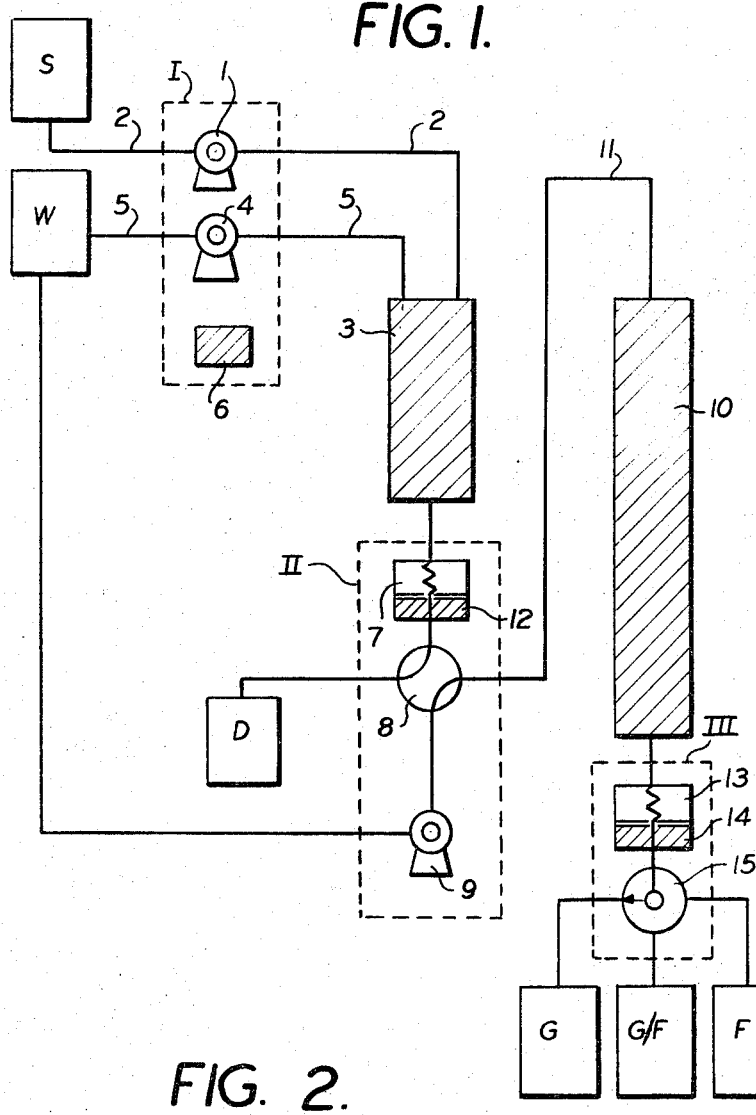

The present invention is concerned with a process for the chromatographic separation of multi-component mixtures.

In recent years, column chromatography has been increasingly used on a large scale for the separation of mixtures of substances. Thus, for example, invert sugar can be chromatographically separated, the components glucose and fructose thereby being obtained in pure form.

Large-scale chromatographic processes are usually carried out cyclically, i.e., separation and elution phases alternate with one another continuously during operation of the process. In order to keep the economy of the process as high as possible, the attempt is made to carry out the separation of mixtures in columns which are as short as possible so that the individual cycles can follow one another as quickly as possible. However, it is often difficult to obtain a sufficient degree of separation under these conditions. Especially great difficulties arise when, in addition to the separation of the main components to be obtained, by-products are also to be separated which result in the cycles being so widely spaced apart that the economy of the separation process is rendered questionable.

In addition to the main components, glucose and fructose, epimerized starch syrups contain, for example, considerable amounts of di- and polysaccharides. For the reasons mentioned above, it was heretofore not possible to obtain from these inexpensive starting materials the very valuable fructose component in pure form and in an economic manner by means of continuous cyclic column chromatography. Thus, if the components of epimerized starch syrups were separated by means of cyclic column chromatography, then the relatively rapidly running contaminated fractions catch up with the already separated fructose fractions of the previous cycle when the cycles are not separated by a suitably long elution interval. However, such long elution intervals would reduce the capacity of the separation plant by more than a half.

The present invention provides an apparatus which permits pure fractions to be obtained from multi-component mixtures on a large scale by means of cyclic column chromatography.

We have found that the time needed for one cycle can be considerably shortened and the above-mentioned disadvantages in prior art processes avoided when the separation column is divided into two sections, the contaminated fraction is removed from the column at the end of the first section, simultaneously an equivalent amount of elution agent is passed into the second section of the column and, after removal of the contaminated fraction, the two column sections are connected together until, at the end of the first column section, the contaminated fraction of the next cycle emerges.

In this manner, the complete length of the column can be utilized for the cyclic separation of multi-component mixtures. Furthermore, the contaminants have no further influence upon the length of the cycle, i.e., the separation of the multi-component mixture takes place just as economically and quickly as in the case of the separation of a mixture which contains only the components of interest.

The process according to the present invention has been investigated with epimerized starch syrups and has proved to be of extraordinary technical advantage. For the separation of such syrups into their components, it is preferred to use an ion exchanger loaded with calcium ions.

It is clear, however, that the process can be used for all large-scale separation processes when the running time of the impurities differs sufficiently from that of the main components to be recovered.

In the case of the separation of epimerized starch syrup, especially good separation results are obtained when the second column section has about twice the length of the first column section.

Generally three substances can be separated from each other with especially good results—provided that one of said substances has a substantially different migration velocity—when both column sections satisfy the following conditions:

(1) Both sections taken together must have at least a length which provides sufficient separation of those fractions containing the components having a similar migration velocity.

(2a) If the fraction containing the component to be removed after the first column section has a higher migration velocity than the other fractions (separation of starch syrup) the length of the first column section bears the relationship to the lengh of both column sections as the difference of the migration velocity of the two slowest fractions bears to the difference of the migration velocity of the two fastest fractions.

(2b) If the fraction containing the component to be removed after the first column section has a lower migration velocity than the other fractions the length of the first column section bears the relationship to the length of both column sections as the difference of the migration velocity of the two fastest fractions bears to the difference of the migration velocity of the two slowest fractions.

Following the above mentioned principle the fraction containing the component having the greatest difference of migration velocity relative to the compound of the middle fraction has to be removed from the end of the first section.

It is to be understood that additional factors, such as column loading and inhomogeneities of the column, may necessitate the experimental optimization of the above values.

Figure 2:
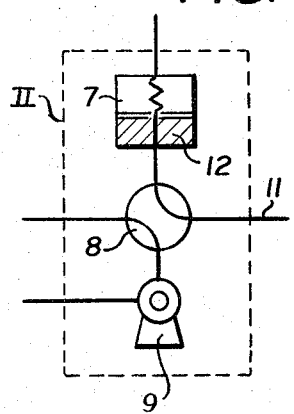

The process of the present invention will now be explained in more detail with reference to the accompanying drawings, in which:

FIG. 1 is a schematic representation of an apparatus for carrying out the process according to the present invention; and FIG. 2 is a detailed view of part of the apparatus illustrated in FIG. 1.

Referring now to FIG. 1 of the accompanying drawings, from a supply tank S, a solution of a multi-component mixture is pumped by pump 1 through a pipe 2 into a first column section 3. After a pre-determined period of time, pump 1 is switched off and, simultaneously, from an elution agent reservoir W, elution agent is pumped by pump 4 through pipe 5 into the first column section 3, the supply capacity of the two pumps 1 and 4 being the same. After termination of the elution phase, pump 4 is switched off and pump 1 is again switched on. Pumps 1 and 4 are operated by a switch clock 6 after empirically determined and rigidly maintained time intervals.

The liquid leaving column section 3 passes through an analyzer 7 which, depending upon the concentration of the individual fractions, operates valve 8 via a control device 12. When the fraction which only contains impurities reaches the analyzer 7, valve 8 is switched in such a manner that liquid leaving the column section 3 is passed into container D; simultaneously, pump 9 is switched on, which pumps elution agent from elution agent container W into column section 10, the supply capacity of pump 9 corresponding exactly to those of pumps 1 and 4. Above a definite concentration in the liquid passing through the analyzer 7, i.e., when the impurities are removed and the concentration of the first main fraction has reached a definite value, valve 8 is switched in such a manner that the analyzer 7 is in direct connection with pipe 11 (see FIG. 2). In this position, pump 9 is switched off so that there is no connection between tank D and tank W.

By means of a logic element incorporated into the analyzer 7, this valve position remains unchanged until the concentration in the liquid flowing through the analyzer 7 increases from 0 to a low limiting value. This is the case when, after an intermediate flow of pure elution agent, impurities of the next cycle again appear in the analyzer 7.

By means of the process according to the present invention, only the main fractions, which are to be further separated, pass into the second and longer column section 10.

The further separation is carried out in the following manner:

An analyzer 13 operates valve 15, via a control device 14, in such a manner that the first fraction is collected in storage tank G and the second fraction in storage tank F. Intermediate fractions, which contain both components, are passed into tank G/F.

The separation plant contains three control units I, II and III which are encircled by broken lines in FIG. 1. Control unit I, containing the switch clock 6 and pumps 1 and 4 operates completely independently and, in the case of the operation of the separation plant, is empirically adjusted in such a manner that the fractions enter control unit III without interruption and with the smallest possible overlapping, one after the other.

Control unit II, containing the analyzer 7 and control device 12, as well as valve 8 and pump 9, serves for the removal of the fractions containing the impurities. The analyzer consists of a simple concentration measuring device, for example, a flow-through refractometer, the measurements results of which are passed to control device 12 as a proportional voltage. Control device 12 possesses a logic element which consists, for example, of a sequence relay and enables valve 8 and pump 9 to operate at a definite concentration only when, at the point of time of operation, the concentration in the liquid flowing through the analyzer 7 is on the increase. The control device also starts upon the operation of the water pump 9 during the take off of the fractions containing the impurities.

Control device III has already been described for the separation of fructose and glucose (see British patent specification No. 1,095,210) and consists of an analyzer 13 with control device 14 and valve 15. It serves to conduct the main fractions into tanks G, G/F, and F. The analyzer 13 consists of measuring devices for the angle of rotation and for the refractive index. The measuring devices are equipped with flow-through cuvettes and provide the control device 13 with measured values in the form of proportional voltages. The control device 14 contains an analog calculator which calculates the partial concentrations of glucose and fructose in the manner described in British patent specification No. 1,095,210, and, upon exceeding the permissible limiting concentrations, operates the valve 15 via a switch relay. For control of the separation process, a multi-color recorder can be attached to the analog calculator of the control device 14, this recorder recording the concentrations of glucose and fructose as a continuous elution diagram.

In FIG. 2, the control unit II is positioned in such a manner that the column section 3 is directly connected with the column section 10 via valve 8 and pipe 11.

The following example is given for the purpose of illustrating the present invention:

EXAMPLE

Large scale production of pure fructose from epimerized starch syrup

Column measurements:
Column section 3: diameter 10 cm., length 4.5 m.
Column section 10: diameter 10 cm., length 9.0 m.

At a rate of flow of 6 liters/hour, 2 liters of an approximately 15% by weight epimerized starch syrup solution were applied to column section 3. After 20 minutes, pump 1 was switched off and, via pump 4, water was pumped for 2.6 hours at a rate of flow of 6 liters/hour, from tank W into column section 3. Pumps 1 and 4 now alternately supply the column section 3 with a constant rhythm. After about 90 minutes, the analyzer 12 indicated the first changes in the refractive index and valve 8 was switched in such a manner that the eluate flowed off into tank D. The column section 10 was now supplied with water by pump 9. After a further 90 minutes, the impurities were removed from the column section 3. At a concentration of about 190 grams glucose/liter, valve 8, was switched over and column section 3 connected with column section 10. The eluate was now further separated in the column section 10 in the usual manner and fed into tanks G, G/F and F. The fructose solution obtained had a specific rotation of about −92° and satisfies the purity requirements of the Deutsches Arzneibuch No. 7 (German Pharmacological Standard Book No. 7).

It will be understood that the foregoing specification and examples are given by way of illustrating the present invention and are not to be construed as unduly limitative thereof inasmuch as other embodiments of the invention will suggest themselves to one skilled in the art.

What is claimed is:

1. Process for the continuous separation of components from multi-component mixtures containing main components and impurities by means of cyclic column chromatography, which process comprises (A) passing, during a first period, a multi-component feed stream into the top of a first column of a set of two chromatographic separation columns comprising a first column and a second, separate column, connected therewith; and, during a second period, passing an elution agent into the top of said first column, and continuing such alternating supply of said first column with feed stream and elution agent, respectively, in the same constant rhythm;

(B) continuously monitoring the composition of the bottoms product of said first column, and passing the bottoms product of said first column into the top of said second column, and, when the amount of impurities therein rises to a predetermined level, diverting the bottoms product containing impurities from the end of the first column out of the system;

(C) while so diverting said bottoms product from said first column, simultaneously passing an equal volume of an elution agent into the top of said second column; and (D) recovering the separated main components at the bottom of said second column.

2. Process for the production of pure fructose from a glucose/fructose syrup contaminated with disaccharides and polysaccharides by means of cyclic column chromatography, which process comprises:

(A) passing, during a first period, the contaminated syrup into the top of a first column of a set of two chromatographic separation columns comprising a first column and a second, separate, column, connected therewith; and, during a second period, passing an elution agent into the top of said first column, and continuing such alternating supply of said first column with feed stream and elution agent, respectively, in the same constant rhythm;

(B) continuously monitoring the composition of the bottoms product of said first column, and passing the bottoms product of said first column into the top of said second column, and, when the amount of disaccharides and polysaccharides therein rises to a predetermined level, diverting the bottoms product containing impurities from the end of the first column out of the system;

(C) while so diverting said bottoms product from said first column, simultaneously passing an equal volume of an elution agent into the top of said second column; and (D) recovering the separated glucose and fructose at the bottom of said second column.

3. Process as claimed in claim 1 wherein the ratio of the length of said first section to the total length of both column sections is substantially the same as the ratio of (a) the difference of the migration velocity of the main components to be recovered at the end of the second section to (b) the difference of the migration velocity of the main component having the migration velocity closest to that of the impurities migration velocity and the migration velocity of the impurities.

4. Process as claimed in claim 2 wherein the separation column is divided so that the second section is about twice as long as said first column section.

5. Process as claimed in claim 1 wherein multi-component mixture and the elution agent are supplied by means of dosing pumps.

6. Process as claimed in claim 2 wherein said separation columns contain an ion exchanger loaded with calcium ions.

7. Process as claimed in claim 2 wherein the constitution of the product obtained at the end of said second section is analyzed by measuring the angle of rotation and the refractive index of the product leaving the said second section and using such measurements in an analog calculator to direct the separation of said product into separate main components.

8. Process as claimed in claim 2 wherein the separation of the contaminated fractions at the end of said first section is carried out by means of a valve controlled by a concentration analyzer and a control device operatively connected therewith.

9. Process as claimed in claim 8 wherein said concentration analyzer comprises a refractometer with a flow-through cuvette which provides a proportional voltage.

10. Process as claimed in claim 1 wherein said first section is alternately subjected, in cyclic fashion, to passing in of said feed stream and to passing in of elution agent.

11. Process as claimed in claim 1 wherein the removing of the fractions containing impurities from the end of the first section is effected when take-off from said first section contains substantially only impurities.

12. Process as claimed in claim 2 wherein the elution agent is water.

13. Apparatus for effecting chromatographic separation of the components in a multi-component mixture which apparatus comprises a separation column separated into two sections, a first section and a second section, feed supply means for introducing dosed amounts of feed mixture to said first section, elution means capable of providing dosed amounts of elution agent to the said first section, valve means and separate container means at the end of said first section, the valve means being capable of directing the flow of the take-off from said first section to either said second or to said container means, conduit means connecting said valve means to the top of said second section, elution means capable of eluting said second section in cyclic fashion, a second valve means and separate product containers at the end of said second section, the second valve means being capable of directing the take-off from said second section into said product containers, depending on the concentration of particular components in said take-off material.

14. Apparatus as claimed in claim 13 wherein said feed mixture supply means and said elution supply means comprise separate dosing pumps of substantially equivalent capacity.

15. Apparatus as claimed in claim 13 wherein said second valve means is controlled by an analog calculator which in turn utilizes a measurement of the angle of rotation and of the refractive index of said second take-off product to determine the constitution of said take-off product.

16. Apparatus as claimed in claim 13 wherein said first valve means is directed by a refractometer with a flow-through cuvette providing a proportional voltage as a measure of the constitution of said first take-off product.

17. Apparatus as claimed in claim 13 wherein the ratio of the length of said first section to both column sections is substantially the same as the ratio of (a) the difference of the migration velocity of the main components to be recovered at the end of the second section to (b) the difference of the migration velocity of the main component having the migration velocity closest to that of the impurities migration velocity and the migration velocity of the impurities.

18. Apparatus as claimed in claim 13 wherein said second section is about twice as long as said first section.

19. Process for the separation of components from three component mixtures by means of cyclic column chromatography, which process comprises (A) passing, during a first period, the three-component feed stream into the top of a first column of a set of two chromatographic separation columns comprising a first column and a second, separate column, connected therewith; and, during a second period, passing an elution agent into the top of said first column, and continuing such alternating supply of said first column with feed stream and elution agent, respectively, in the same constant rhythm;

(B) continuously monitoring the composition of the bottoms product of said first column, and passing the bottoms product of said first column into the top of said second column, and, when the amount of a first component having the greatest difference of migration velocity relative to the component of the middle fraction, therein rises to a predetermined level, diverting the bottoms product containing said first component from the end of the first column out of the system;

(C) while so diverting said bottoms product from said first column, simultaneously passing an equal volume of an elution agent into the top of said second column; and (D) recovering the separated remaining components at the bottom of said second column.

References Cited

UNITED STATES PATENTS

| 3,458,437 | 7/1969 | Ouano | 210—198 X |
|-----------|--------|-------|-----------|
| 3,508,880 | 4/1970 | Hrdina | 210—198 |

JOHN ADEE, Primary Examiner

U.S. Cl. X.R.

210—198 C

UNITED STATES PATENT OFFICE
CERTIFICATE OF CORRECTION

Patent No. 3,686,117     Dated August 22, 1972

Inventor(s) K. Lauer et al

It is certified that error appears in the above-identified patent and that said Letters Patent are hereby corrected as shown below:

<u>Col. 4, line 15</u>

For        "13"

read       -- 14 --

Signed and sealed this 13th day of February 1973.

(SEAL)
Attest:

EDWARD M. FLETCHER, JR.          ROBERT GOTTSCHALK
Attesting Officer                Commissioner of Patents